(12) United States Patent
Steiner et al.

(10) Patent No.: US 10,409,665 B2
(45) Date of Patent: Sep. 10, 2019

(54) SYSTEM AND METHOD FOR REAL-TIME DETECTION OF ANOMALIES IN DATABASE USAGE

(71) Applicant: Northrop Grumman Systems Corporation, Falls Church, VA (US)

(72) Inventors: Donald Steiner, McLean, VA (US); John Day, Palm Bay, FL (US)

(73) Assignee: NORTHRUP GRUMMAN SYSTEMS CORPORATION, Falls Church, VA (US)

( * ) Notice: Subject to any disclaimer, the term of this patent is extended or adjusted under 35 U.S.C. 154(b) by 62 days.

(21) Appl. No.: 14/732,162

(22) Filed: Jun. 5, 2015

(65) Prior Publication Data
US 2015/0355957 A1 Dec. 10, 2015

Related U.S. Application Data

(60) Provisional application No. 62/009,736, filed on Jun. 9, 2014.

(51) Int. Cl.
*G06F 11/07* (2006.01)
*G06F 21/55* (2013.01)
(Continued)

(52) U.S. Cl.
CPC ........ *G06F 11/079* (2013.01); *G06F 11/0709* (2013.01); *G06F 11/0727* (2013.01);
(Continued)

(58) Field of Classification Search
CPC .... G06F 11/079; G06F 11/0709; G06F 11/34; G06F 11/3447; G06F 11/3452;
(Continued)

(56) References Cited

U.S. PATENT DOCUMENTS 7,558,796 B1 * 7/2009 Bromwich ........ G06F 17/30386
8,200,743 B2 * 6/2012 Lee ..................... G06F 11/0709
709/202

(Continued)

OTHER PUBLICATIONS

Lahiri et al. "Space-efficient Tracking of Persistent Items in a Massive Data Stream".Jul. 2011. ACM. pp. 255-266.*

(Continued)

*Primary Examiner* — Yolanda L Wilson
(74) *Attorney, Agent, or Firm* — Katten Muchin Rosenman LLP (57) ABSTRACT

A system and method for real-time detection of anomalies in database or application usage is disclosed. Embodiments provide a mechanism to detect anomalies in database or application usage, such as data exfiltration attempts, first by identifying correlations (e.g., patterns of normalcy) in events across different heterogeneous data streams (such as those associated with ordinary, authorized and benign database usage, workstation usage, user behavior or application usage) and second by identifying deviations/anomalies from these patterns of normalcy across data streams in real-time as data is being accessed. An alert is issued upon detection of an anomaly, wherein a type of alert is determined based on a characteristic of the detected anomaly.

38 Claims, 6 Drawing Sheets

(51) Int. Cl.
*G06F 21/62* (2013.01)
*G06F 11/34* (2006.01)

(52) U.S. Cl.
CPC ...... *G06F 11/0751* (2013.01); *G06F 11/0772* (2013.01); *G06F 11/0787* (2013.01); *G06F 21/552* (2013.01); *G06F 21/6227* (2013.01); *G06F 11/3409* (2013.01); *G06F 11/3438* (2013.01); *G06F 2201/86* (2013.01)

(58) Field of Classification Search
CPC ............... G06F 21/552; G06F 21/6227; H04L 41/0631; H04L 41/0604; H04L 41/065
See application file for complete search history.

(56) References Cited

U.S. PATENT DOCUMENTS

| | | | | |
|---|---|---|---|---|
| 8,996,690 | B1* | 3/2015 | Pauley | H04L 63/102 340/506 |
| 2005/0038818 | A1* | 2/2005 | Hooks | G06F 11/0748 |
| 2005/0080806 | A1* | 4/2005 | Doganata | G06F 11/0709 |
| 2005/0091640 | A1* | 4/2005 | McCollum | G06F 11/0709 717/117 |
| 2005/0203881 | A1* | 9/2005 | Sakamoto | G06F 21/552 |
| 2008/0133979 | A1* | 6/2008 | Lee | G06F 11/004 714/48 |
| 2009/0183023 | A1* | 7/2009 | Rathunde | G06F 11/0709 714/4.2 |
| 2009/0214191 | A1* | 8/2009 | Allard | H04N 5/76 386/248 |
| 2009/0313508 | A1* | 12/2009 | Yan | G06F 11/008 714/47.2 |
| 2011/0106938 | A1* | 5/2011 | Gopisetty | G06F 11/3495 709/224 |
| 2011/0185014 | A1* | 7/2011 | Eccles | G06F 9/44505 709/203 |
| 2011/0246837 | A1* | 10/2011 | Kato | G06Q 10/02 714/47.1 |
| 2011/0271146 | A1* | 11/2011 | Mork | G06F 21/55 714/37 |
| 2012/0297016 | A1* | 11/2012 | Iyer | G06F 9/5072 709/217 |
| 2012/0297054 | A1* | 11/2012 | Breiter | G06F 11/3006 709/224 |
| 2013/0019309 | A1 | 1/2013 | Strayer et al. | |
| 2013/0081065 | A1* | 3/2013 | Sharan | G06F 11/3006 719/318 |
| 2013/0091539 | A1 | 4/2013 | Khurana et al. | |
| 2013/0283088 | A1* | 10/2013 | Behrendt | G06F 11/0793 714/2 |
| 2013/0305093 | A1* | 11/2013 | Jayachandran | G06F 11/0754 714/37 |
| 2013/0346596 | A1 | 12/2013 | Balakrishnan et al. | |
| 2014/0006330 | A1* | 1/2014 | Biem | G06F 11/0751 706/46 |
| 2014/0096249 | A1* | 4/2014 | Dupont | G06F 21/00 726/23 |
| 2014/0310222 | A1* | 10/2014 | Davlos | G06N 5/04 706/46 |
| 2014/0372347 | A1* | 12/2014 | Cohen | G06F 11/0709 706/12 |
| 2015/0347214 | A1* | 12/2015 | Samuni | G06F 21/552 714/37 |

OTHER PUBLICATIONS

International Search Report Issued in International PCT Application PCT/US2015/034468 dated Aug. 28, 2015.

* cited by examiner

SYSTEM AND METHOD FOR REAL-TIME DETECTION OF ANOMALIES IN DATABASE USAGE

CROSS REFERENCE TO RELATED APPLICATION(S)

This application claims priority from U.S. Provisional Patent Application. No. 62/009,736, filed on Jun. 9, 2014, which is hereby incorporated herein by reference in its entirety.

FIELD

Embodiments are in the technical field of database or application usage. More particularly, embodiments disclosed herein relate to systems and methods for real-time detection of anomalies in database or application usage which, inter alia, foster discovery of patterns of behavior and anomalies from across a plurality of heterogeneous data streams in real-time in order to detect anomalies that could not have been detected by monitoring any single data stream alone.

BACKGROUND

Significant damage, both reported and unreported, has been caused to enterprises, government agencies, and national security through "insider threat" attacks, especially data exfiltration. For example, consider recent retrieval and release of secret and top-secret information from the defense and intelligence communities by Manning and Snowden. Data exfiltration attacks may include, e.g., intentional user activity (e.g., a user impermissibly downloads sensitive data and removes the data from the enterprise) or automated activity (e.g., malicious software operates on behalf of or as a user with or without the user's knowledge). Unfortunately, the current state of the art for addressing such problems is quite limited.

1. Monitoring of all System Data: Due to the large volume of data that is required to monitor ALL users and systems in an enterprise, this data (often only portions of the required data) is usually stored and analyzed off-line in a database or data warehouse. Unfortunately, this analysis only reveals issues after the fact, i.e., after any actual data exfiltration attempts have occurred and at such a point in time when it may be too late to take any action or to prevent damage from the exfiltration. In a best case, the offending user or system is still there and may be expected to perform such actions again, where they can be targeted for further analysis and prosecution. However, many times, the offending user or system is no longer present, the damage has already been done or it is otherwise too late to take effective action.

2. Real-time Monitoring of Suspected Individuals: If an individual is suspected of malicious activity, then real-time monitoring mechanisms can be configured and installed to directly monitor that individual's activity and detect any malicious activity. These mechanisms, however, are time consuming to install and also require dedicated analysts to conduct the real-time monitoring and detection, often at great expense to the affected enterprise.

As noted above, there are significant problems with the above approaches. The above approaches are slow to react, may not catch a user in time, and have a hard time detecting malicious software that is installed and operating on behalf of a user without the user's knowledge or authorization. Furthermore, the above approaches to addressing data exfiltration problems are expensive to deploy and consume human analyst time and resources.

The insider threat remains one of the most significant problems confronting enterprises and government agencies of all sizes today. The threat is multi-faceted with a high degree of variability in the perpetrator, the type of attack, the intent of the attack, and the access means. No solution today adequately addresses the detection of insider threats due to the highly variable nature of the problem.

No existing systems or solutions takes user, database, application, and network activity all into account at the same time while using event processing techniques to discover patterns of behavior and anomalies from across these plurality of data streams in real-time in order to detect anomalies that could not have been detected by monitoring any single data stream alone.

Thus, it is desirable to provide a system and method for real-time detection of anomalies in database or application usage which are able to overcome the above disadvantages.

SUMMARY

Embodiments are directed to a method for real-time detection of anomalies. The method comprises: receiving a plurality of heterogeneous data streams, wherein the heterogeneous data streams are received from at least two of a group consisting of agents located at databases, agents located at applications, audit programs located at user workstations, and sensors located in, or at access points to, a network; correlating the heterogeneous data streams, wherein the correlation identifies corresponding events in different ones of the heterogeneous data streams; identifying patterns of events across the correlated heterogeneous data streams; building a model of normalcy from the identified pattern of events, wherein the model of normalcy is stored in an analysis database; creating rules that determine how and whether anomalies are detected, how a detected anomaly is treated and characterized, and what reaction to employ upon detection of the anomaly; receiving a plurality of additional heterogeneous data streams from the at least two of a group consisting of the agents, audit programs, and sensors; applying, using an analysis engine, the model of normalcy and rules to the additional heterogeneous data streams and analyzing data from the additional heterogeneous data streams against the model of normalcy and rules; detecting an anomaly in real-time by determining whether an anomalous event is present, by the application of the rules and whether events, in relation to other events within the additional heterogeneous data streams, fit or do not fit the model of normalcy; determining at least one characteristic of the detected anomaly; and issuing an alert upon detection of the anomaly, wherein a type of alert is determined based on the at least one determined characteristic of the detected anomaly. The detected anomaly is indicative of unauthorized manipulation or falsification of data, sabotage of a database, or exfiltration of data.

In an embodiment, the correlating is performed using a complex event processor for correlating the heterogeneous data streams and integrating the heterogeneous data streams into a single integrated data stream. The correlating may include synchronizing the time of each of the heterogeneous data streams in order to correlate events across time. The correlating may be performed by application of a small-space algorithm (SSA). In the applying step, the analysis engine may use the complex event processor for applying the model of normalcy and rules to the additional heterogeneous data streams and for analyzing data from the additional heterogeneous data streams against the model of normalcy and rules.

In an embodiment, the heterogeneous data streams and/or the additional heterogeneous data streams may be processed using an automatic event tabulator and correlator (AETAC) algorithm to reduce event data complexity and facilitate search, retrieval, and correlation of the event data to thereby produce uniform event data whereby complex event processing of the heterogeneous data streams and/or the additional heterogeneous data streams by the complex event processor is simplified.

In an embodiment, the identified pattern of events may be associated with ordinary, authorized, and benign database usage, workstation usage, user behavior or application usage.

In an embodiment, the heterogeneous data streams may be multi-modal asynchronous signals.

In an embodiment, one of the heterogeneous data streams corresponds to an ordinary, authorized, and benign database query and another of the heterogeneous data streams corresponds to an ordinary, authorized, and benign user interaction at the user workstation, and wherein the identified pattern of events is the ordinary, authorized, and benign database query and the ordinary, authorized, and benign user interaction at the user workstation. The detecting step may detect the anomaly when an event within the additional heterogeneous data streams corresponding to a database query is not preceded by a user interaction at the user workstation within a predetermined period of time resulting in the event not fitting the model of normalcy.

In an embodiment, the alert may comprise at least one of a group consisting of alarm message, a communication triggering further analysis and/or action, a command instructing the restriction or shutting down of an affected workstation, database, network or network access, initiation of additional targeted monitoring, analysis, and/or applications to capture additional detailed information regarding an attack, continued monitoring of a user, placement of a flag in a file for further follow-up, restricting access to a network, alerting security, and restricting or locking down a building or a portion of a building.

In an embodiment, in the receiving a plurality of heterogeneous data streams step, the heterogeneous data streams may be received by the analysis engine.

In an embodiment, the databases, applications, workstations, or networks may be in an enterprise environment.

Embodiments are also directed to system for real-time detection of anomalies. The system includes one or more computers, each computer including a processor and memory, wherein the memory includes instructions that are executed by the processor for performing the above-mentioned method.

BRIEF DESCRIPTION OF THE DRAWINGS

The detailed description will refer to the following drawings, wherein like numerals refer to like elements, and wherein.

DETAILED DESCRIPTION

It is to be understood that the figures and descriptions of the present invention may have been simplified to illustrate elements that are relevant for a clear understanding of the present invention, while eliminating, for purposes of clarity, other elements found in a typical database system or typical method of using a database. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Described herein are embodiments of a system and method for real-time detection of anomalies in database or application usage. Embodiments overcome the problems described above. Embodiments address the above problems and improves the state of the art by providing an automated mechanism to continuously monitor ALL users and systems for abnormalities, and automatically alerting on violations and deviations from expected behaviors as they are occurring in real time without incurring heavy overhead expenses in human time and labor. Embodiments provide a system and method that takes user, database, application, and network activity all into account at the same time while using event processing techniques to discover patterns of behavior and anomalies from across these data streams in real-time in order to detect anomalies that could not have been detected by monitoring any single data stream.

Embodiments provide a mechanism to detect anomalies in database access and usage, such as data exfiltration attempts, first by identifying correlations (e.g., patterns or models of normalcy) in events across different relevant yet heterogeneous data streams (such as those associated with ordinary, authorized and benign database usage, workstation usage, user behavior or application usage) and second by identifying deviations from these patterns or models of normalcy across data streams in real time as data is being accessed.

Embodiments identify and alert in real-time (i.e., as events are occurring, not after the fact) insider threat attacks targeting database and systems using databases, such as file storage and sharing systems. Such threats may involve unauthorized manipulation and falsification of data, sabotage of databases, and exfiltration of data. Data exfiltration refers to users (or agents and/or software systems acting on behalf of users, possibly unknown to the user) illicitly accessing, retrieving, and downloading data that is confidential and proprietary to an enterprise, often with the malicious intent of distributing the data outside the enterprise for personal gain or simply detriment to the enterprise.

Embodiments of a system and method for real-time detection of anomalies in database or application usage may include a mechanism and processes that provide and analyze, in real-time, a variety of heterogeneous streams within the enterprise comprising an amalgam of relevant events pertaining to data access, user behavior, and computer and network activity. Taken together, these event streams can identify anomalous system behavior that is indicative of insider threats and data exfiltration. Embodiments can identify anomalous system behavior that cannot be identified from analyzing any single event stream on its own.

Such relevant enterprise event streams that may be monitored and analyzed by embodiments described herein include, but are not limited to:
Data Access
 File-system access
 Meta-data concerning Database I/O
 Content of database queries (such as SQL queries) and responses
User Behavior
 User logon/logoff events
 User keyboard/mouse events, including system commands and application interaction
 Email activity (SMTP)
 Web activity
Computer Activity
 Process activity
 Local I/O activity (e.g., USB ports)
Network Activity
 packet capture (PCAP) data from user machine
 PCAP data from servers Using complex event processing (CEP) and unsupervised or semi-supervised machine learning techniques, embodiments of the system and method develop models of normalcy correlating the events derived from the selected enterprise streams (e.g., the above-identified streams) based on typical (authorized and benign) behavior of the users, computers, databases, applications, and networks. These models are then used by embodiments of the system and method to identify anomalies in the event streams that may be predictive or indicative of insider threat attacks, including unauthorized data manipulation, falsification, sabotage and data exfiltration.

A key inventive feature of embodiments described herein is the application of automated machine learning concepts for correlating events and detecting anomalies across heterogeneous data streams to the specific data streams relating to database, user, application, computer, and network activity in order to detect insider threats and data exfiltration attempts taking all the available information into account while it is happening in real time. Monitoring of any individual stream alone will not detect all anomalous events. Existing technologies do not provide these advantages. For example:

1. Traditional insider threat detection systems such as Raytheon's InnerView and SureView™ record and store user and computer activity for off-line static analysis;

2. Database monitoring: Stand-alone systems such as IBM® InfoSphere Guardium monitor and analyze database activity. However, such systems do not take other user, application, or network activity into account.

3. User monitoring: Stand-alone systems such as Centrify® DirectAudit monitor and analyze user activity in real time on a workstation or desktop. However, such systems do not take other application, database, or network activity into account.

4. Network activity. Stand-alone systems such as SNORT® monitor and analyze network activity in an enterprise network. Such systems do not take user activity, application, or database activity into account.

No system takes user, database, application, and network activity all into account at the same time while using event processing techniques to discover patterns of behavior and anomalies from across these data streams in real-time in order to detect anomalies that could not have been detected by monitoring any single data stream.

Figure 1:
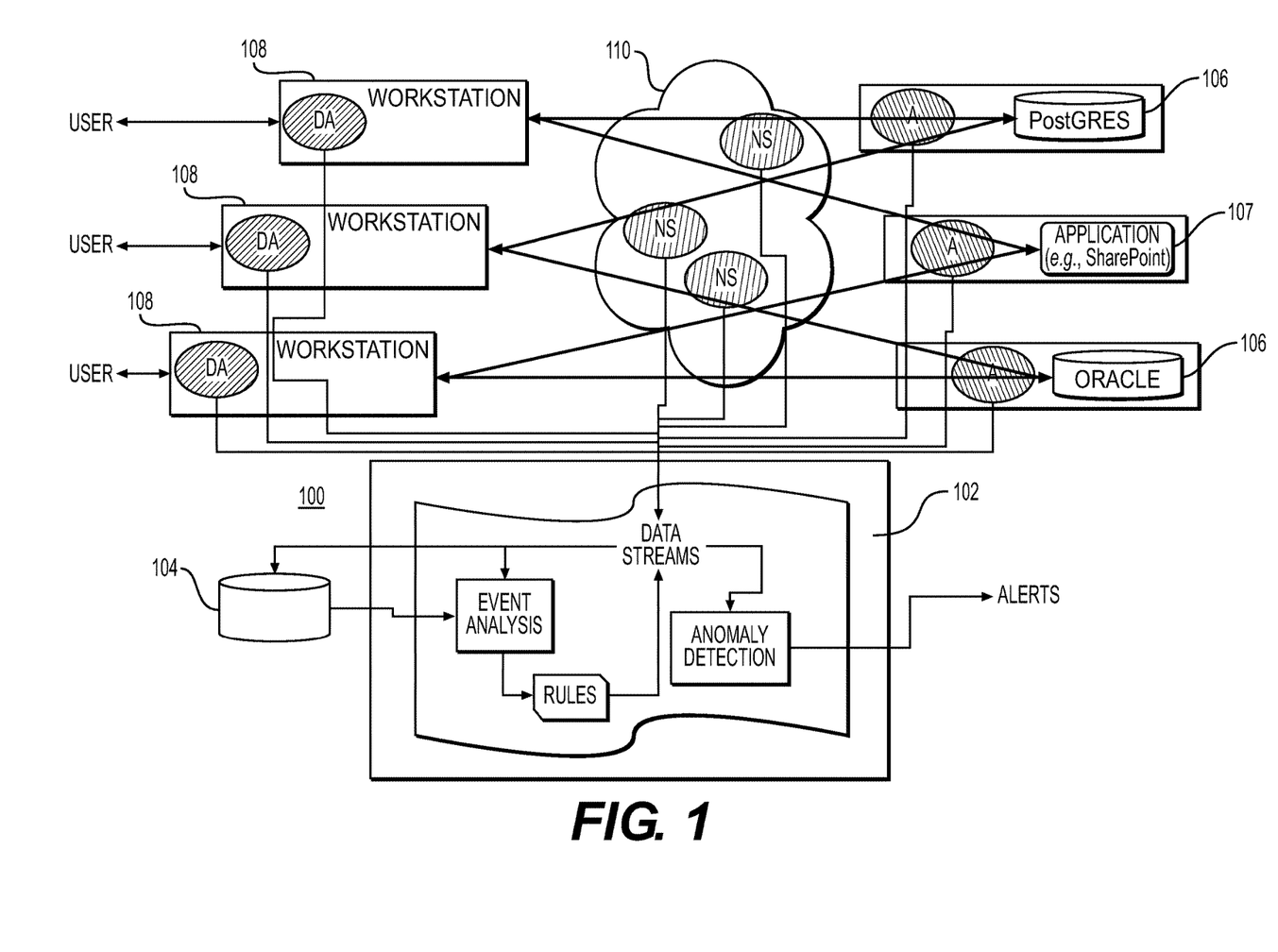
FIG. 1 is a block diagram illustrating an embodiment of a system for real-time detection of anomalies in database or application usage.

With reference now to FIG. 1, shown is a block diagram illustrating components of an embodiment of a system 100 for real-time detection of anomalies in database or application usage. System 100 may include an analysis engine 102 and an analysis database 104. Analysis engine 102 may receive data streams, such as the data streams described above. For example, analysis engine 102 may receive data streams indicative of user, database or other data access, application, computer and network behavior and activity. Such data streams may be generated and received from various agents, sensors and audit programs located at workstations, in networks or at network access points, data storage (e.g., database) locations, and data processing (e.g., application) locations.

For example, system 100 may include monitoring agents (A), such as IBM® Guardium agents, located at (operating on) databases 106, agents (A) located at applications (e.g., SharePoint) 107, direct audit programs (DA), such as Centrify® DirectAudit, located at (operating on) user workstations 108, and network sensors (NS), such as OpenNMS, located in, or at access points to, a network(s) 110. Each type of agent, program or sensor may produce different types of data streams. For example, IBM® Guardium agents may generate data streams indicative of database interaction on a database server including a timestamp, client machine IP, database user ID, database server IP, and the database query (SQL query). Centrify® DirectAudit may generate a data stream indicative of user interaction on a user machine/workstation including a timestamp, machine user ID and user commands (e.g., as typed into TTY/Shell). The output of some agents, programs and sensors may be modified to work with embodiments described herein. For example, some agents, programs and sensors produce GUI output. Scripts and other mechanisms to extract relevant data and output to, e.g., syslogger, may be used. Analysis engine 102 may include a complex event processor (CEP) that correlates the multiple data streams and integrates such data streams into an integrated data stream. Such correlation may include synchronizing the time of each data stream in order to correlate events across time. The streams of data may include raw, meta and derived data. The CEP platform may ingest multi-modal asynchronous signals from heterogeneous sources. The analysis engines 102 CEP platform may then apply the models of normalcy to the integrated data stream.

With continuing reference to FIG. 1, analysis engine 102 may receive and process such data streams to (a) determine models or patterns of normalcy and (b) to analyze real-time behavior and activity against such models or patterns of normalcy in order to detect anomalies. In analyzing real-time behavior and activity, analysis engine 102 detects events in the data streams, compares the events, or more particularly, the patterns of events in the data streams, against the models of normalcy per rules that are based on such models and designed to enable the analysis engine 102 to determine when a variance from the model of normalcy is indicative of an anomaly, and, when an anomaly is detected as a result of such comparison and application of such rules, issues an alert. An alert may include an alarm message(s), communications to relevant personal triggering further analysis and/or action, commands instructing the shutting down of the affected workstation, database, network or network access, or starting of more targeted monitoring and analysis systems, applications and/or other efforts to capture more detailed information regarding an attack. Results of detection analysis may be stored in analysis database 104.

To build the models of normalcy, analysis engine 102 receives data streams that result from controlled, known typical (authorized and benign) behavior of the users, computers, databases, applications, and networks, analyzes such data streams to determine the pattern of events resulting from such typical behavior and builds a model of the patterns of events occurring during such typical behavior. Analysis engine 102 may generate the aforementioned rules based on the models of normalcy built from such patterns. Ordinarily, the greater the amount of such typical behavior that is analyzed and used to build models of normalcy, the larger number of typical patterns of events may be recognized and incorporated into the models. Likewise, greater refinement in the models may be achieved, for example by building models for subsets of typical behavior—e.g., typical behavior under normal operating conditions, typical behavior under emergency operating conditions, typical behavior under off-hours operating conditions, etc. In other words, embodiments of system 100 may build different models of normalcy that are applicable to different operating conditions and which are applied by analysis engine 102 according to the prevalent operating condition. The models of normalcy and rules may be stored in analysis database 104.

To summarize, embodiments may identify correlations or patterns of behavior through a variety of monitoring agents, programs and sensors and then identify anomalies by detecting deviations from the patterns in real-time.

Embodiments of system 100 may develop the models of normalcy and rules through machine learning techniques applied by the CEP platform. Such machine learning techniques may be unsupervised or semi-supervised. As system 100 operates, analysis engine 102 may continue to apply machine learning techniques to further update the models and rules.

Figure 2:
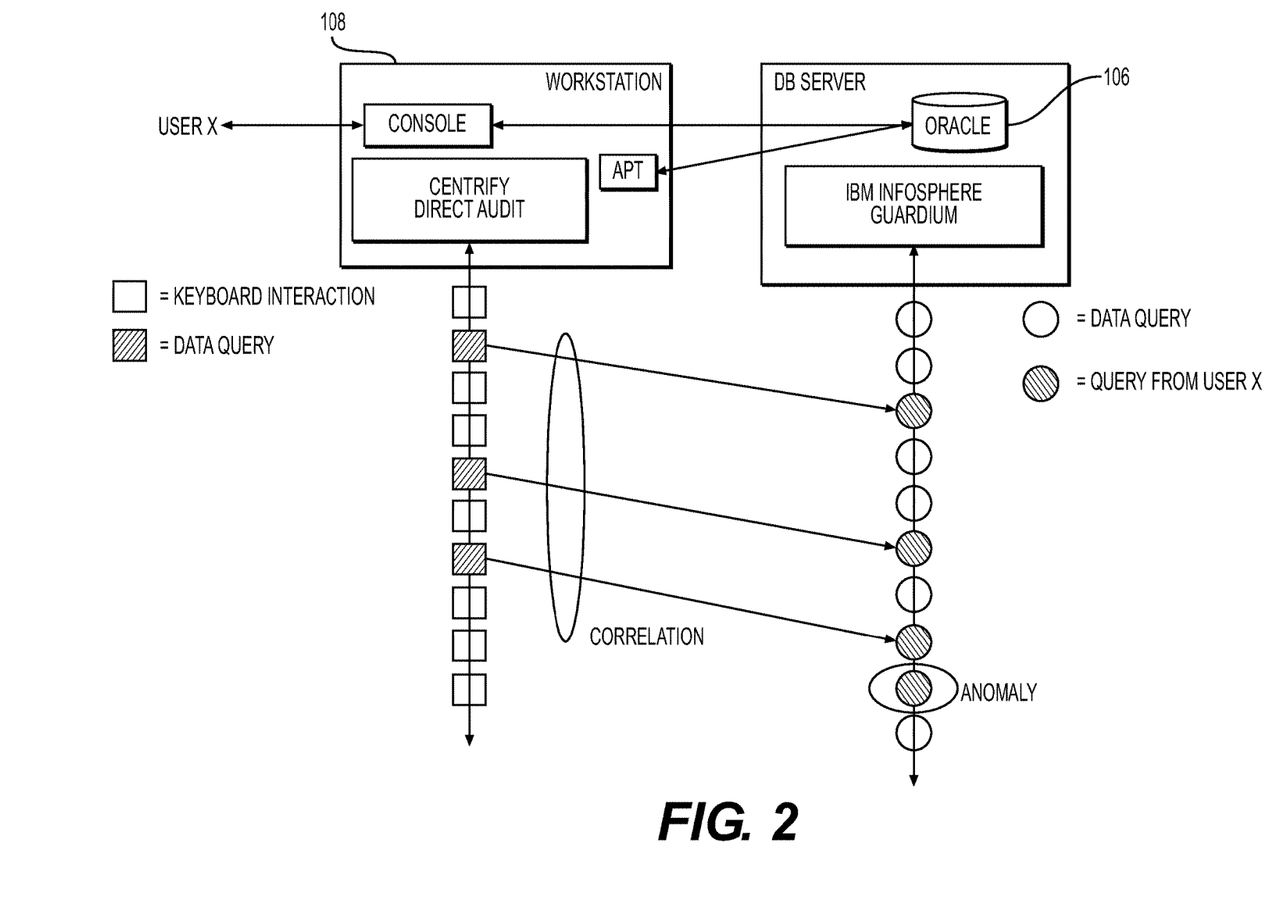
FIG. 2 is a block diagram illustrating an example of multiple data stream event correlation and anomaly detection.

Experiments demonstrate that anomalies often cannot be detected by looking at a single event. Rather, analyzing a pattern or sequence of events and comparing to other patterns or sequence of events can detect anomalies not detectable by looking at a single event. For example, a database query by itself would not appear to be anomalous. However, when most database queries are preceded by a user interaction (e.g., input into a keyboard), a database query that is not so preceded would likely be anomalous. To illustrate, consider the following scenario:

A user makes regular (authorized) queries to a database. Keyboard is used to enter queries
  An Advanced Persistent Threat (APT) malware is installed on the user's machine.
  The APT makes an (unauthorized) query to the database. Keyboard is NOT used Detecting the threat may include the analysis engine 102 recognizing that
  Pattern: Database query is preceded by user interaction
  Anomaly: Database query is NOT preceded by user interaction Such pattern recognition often requires a correlation between the data streams received from different agents, programs and sensors. With reference now to FIG. 2, shown is an illustration of data streams received from a user X workstation audit program, e.g., Centrify® DirectAudit, and a database monitoring agent, e.g., IBM®'s Guardium. As shown, the audit program stream shows the keyboard interactions of user X. The database monitoring agent stream may include numerous data queries, some from the user X workstation and others from other workstations, etc. The CEP platform of analysis engine 102 may correlate the keyboard interactions from the user X audit data stream with the data queries shown by the agent data stream. In so doing, analysis engine 102 may determine that one of the data queries from user X is not correlated with/preceded by a keyboard interaction on user x machine. If the applicable model of normalcy indicates that typical data queries are always preceded by/correlated with a keyboard interaction, analysis engine 102 may characterize the uncorrelated data query as an anomaly (and, therefore, issue an alert).

The correlation between events in different data streams may be quite granular. For example, a model or pattern of normalcy may dictate that a certain event from one data stream is always preceded within, e.g., five (5) seconds, by a certain event from a second data stream. Likewise, the model of normalcy may dictate that the event from one data stream is always preceded by one or more of a variety of events from a second data stream. Embodiments may apply a time window to detect correlations. Embodiments may increase or decrease the time window used in order to increase or decrease the potential number of correlations.

Embodiments of analysis engine 102 may apply a small-space algorithm (SSA) to process the data streams and correlate events. SSA is a new form of stream processing over distributed massive streams. SSA estimates frequently occurring items on a logarithmic space scale (tractable) and permits online extraction of persistent objects in a streaming network. SSA was developed by Prof. Srikanta Tirthapura at Iowa State University. SSA identifies persistent events in data streams. For the purposes of this description, an event is time-stamped data. A persistent event is time-stamped data that appears regularly over time. Characteristics of data streams typically require that all algorithms operate on data in a single pass. Events may be sparse, occur only infrequently, or even appear in different distributed streams. Embodiments may use statistical data sampling to reduce size of stream without overlooking persistent events. SSA determines associations between events in the data stream. Such associations may be temporal, spatial or generalized Associations over other metrics. SSA makes use of "Frequency Moments" that estimate the total number of objects in a stream without having to search the entire stream. Importantly, SSA can learn the persistent events in a data stream without any prior knowledge and without having to track all of the events in the data stream. Implementations of SSA perform association rule mining to exploit prior and collateral domain knowledge to increase the selectivity of event persistence detection. This decreases false negative errors and increase the ability to detect more transient events.

Embodiments identify anomalous behavior by finding associations (or correlations) between events occurring in different (distributed, heterogeneous) data streams. Embodiments identify "patterns of normalcy" and monitor events for disruption from these patterns. Data for making the predictions may come from sensor networks (e.g., agents, audit programs, network and other sensors) generating heterogeneous streams of observations ('event' loosely defined here as 'time-stamped data'). A challenge is to detect and recognize, from sensor samples, pre-cursor events for "hidden" spatiotemporal processes.

The following describes applicable metrics of SSA that are applicable to embodiments of the system and method for real-time detection of anomalies in database or application usage described herein. Different algorithms identify those events in a stream occurring with a given frequency value $\alpha$(alpha). A naïve algorithm identifies all $\alpha$-persistent events given unlimited resources (memory). The SSA algorithm identifies most of the persistent events at an accuracy rate determined by a given $\varepsilon$ value (epsilon). Space compression and false negative rate are directly proportional to the chosen epsilon value as shown below and in FIGS. 5 and 6.

A "naïve" algorithm is a baseline or obvious way to perform a task, contrasted with the present embodiment's algorithm, which improves, optimizes, or otherwise enhances the naïve algorithm. The naïve algorithm for SSA is merely to sample and count every packet in the stream. But these streams tend to be too large to be exhaustively sampled on current computing platforms, so SSA proposes a method involving subsampling to estimate the total counts, optimizing storage space at the expense of accuracy. The epsilon parameter is used to tune SSA in order to achieve the optimal trade-off between accuracy and storage space.

Figure 5:
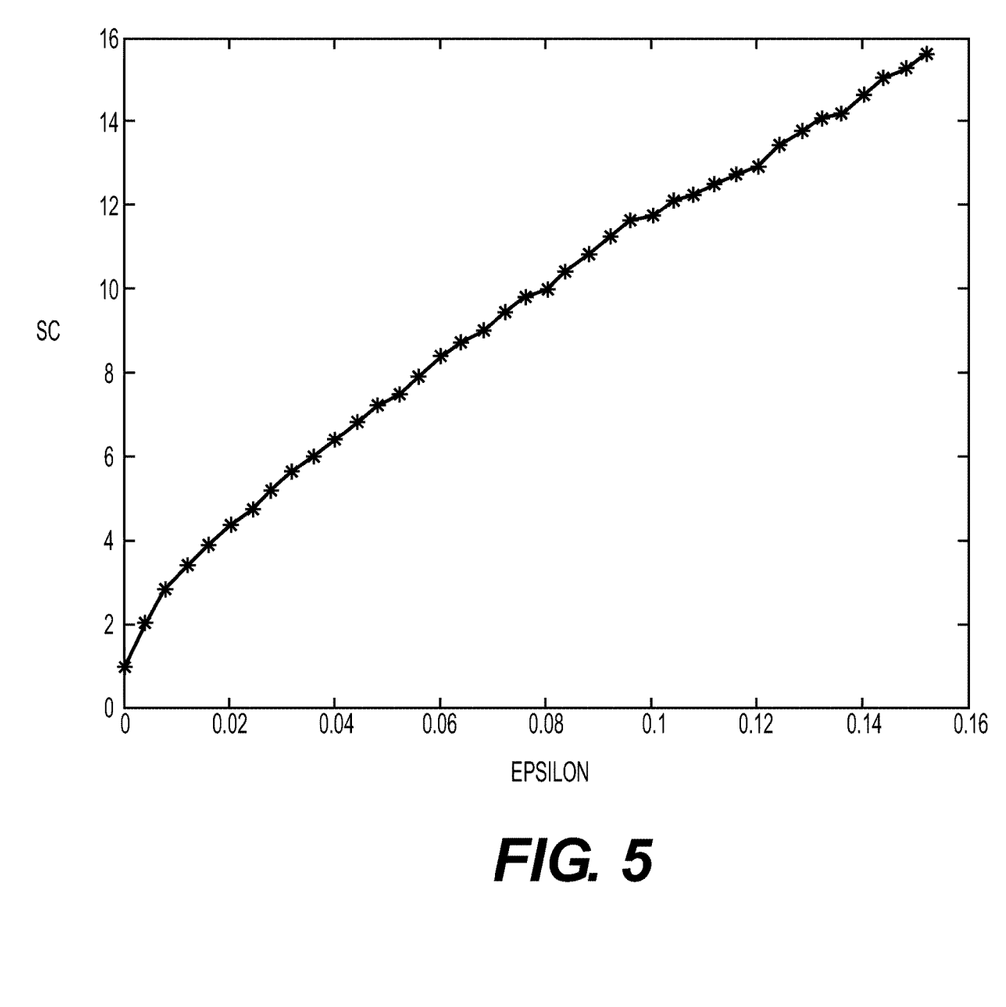
FIG. 5 is a graph illustrating space compression (SC) versus epsilon.

Space Compression (SC):

$$\frac{\text{\# of tuples created by naïve algorithm}}{\text{\# of tuples created by } SSA}$$

Figure 6:
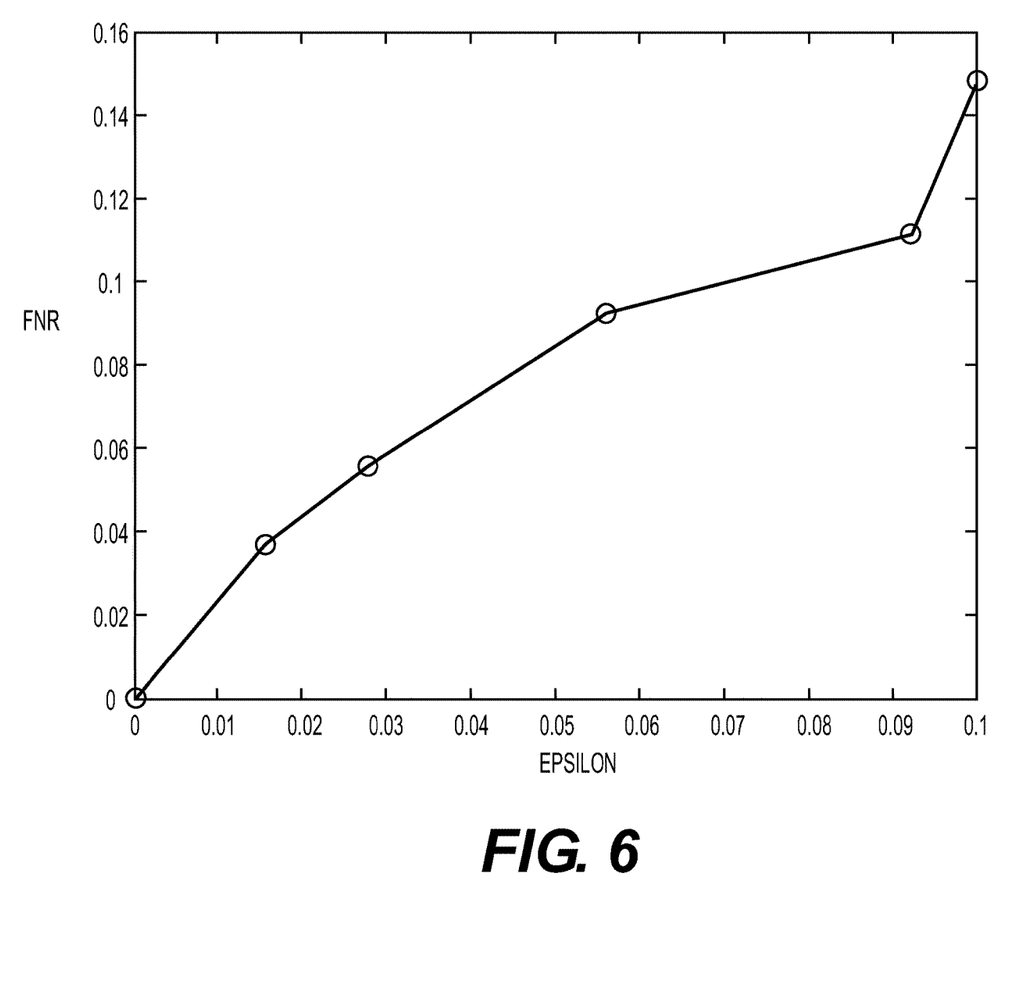
FIG. 6 is a graph illustrating false negative rate (FNR) versus epsilon.

False Negative Rate (FNR):

$$\frac{\text{\# of } \alpha\text{-persistent objects reported by naïve algorithm that were not reported by } SSA}{\text{\# of } \alpha\text{-persistent objects reported by naïve algorithm}}$$

The $\varepsilon$ value (epsilon) controls the trade-off between these two quantities:
High $\varepsilon$ yields high compression, but also high FNR
Low $\varepsilon$ yields low FNR, but also low compression
Caveats: Sensitive to the distribution of $\alpha$-persistent items in the stream
$\alpha$-persistent: $\alpha$ is percentage of monitored timeslots in which object occurs FIGS. 5 and 6 respectively graphically illustrate space compression (SC) and false negative rate (FNR) versus epsilon. As illustrated in FIGS. 5 and 6, these graphs show that SC and FNR increase roughly linearly with respect to epsilon. The graphs assume $\alpha=0.2$ with insider threat events occurring in 18-minute intervals.

In certain implementations that utilize heterogeneous data streams, correlation of events received from a plurality of various heterogeneous data streams often requires certain processing, modification and manipulation of the raw stream data. This processing, etc., enables embodiments of the system and method for real-time detection of anomalies in database or application usage to correlate heterogeneous data streams, detect events, correlate events across data streams and otherwise perform real-time detection.

An embodiment of a system and method for processing of heterogeneous data streams may be referred to as an automatic event tabulator and correlator (AETAC). Embodiments of AETAC include an algorithm that automatically tabulates and correlates event data collected by sensors and other automated data collection devices. Embodiments of AETAC can process events of all types uniformly, even if the data definitions for each device are different (i.e., "heterogeneous"). Embodiments of AETAC operate by imposing a mathematic structure ("homomorphism") on each event type that makes all events look the same to the tabulating device and then further imposing a requirement that this structure be preserved through successive processing steps ("closure"), such that all outputs from the tabulator have the same mathematical structure as the input events. This uniformity reduces data complexity and facilitates searches, retrievals and correlation of event data at any stage of processing, such that complex event processing (CEP) may be reduced to abstractions equivalent to evaluating simple mathematical expressions.

A purpose of AETAC is to improve the performance of complex event processing (CEP) systems that monitor large networks of sensors or other kinds of data collection devices. Embodiments of AETAC reduce or eliminate the need to write customized code for each device that collects data. Embodiments achieve this simplification by imposing several mild restrictions on the allowable formats of the data, which do not impede the functioning of the collection devices. The resulting uniformity makes it easier to compare events across space and time and, consequently, increases the overall "situational awareness" of networks organized under AETAC principles.

AETAC reduces complexity by imposing a simple structure on events that requires the data conform to these mild restrictions:
1) The events recognized by the sensor can be described as lists of names and values;
2) Each generated list is discrete and unique, in the sense that it bears a unique identifier and timestamp. (This is easily accomplished by using one-up sequences or hash codes);
3) The lists can be decomposed into deterministic types, such that the composition of each list is fixed for each type. Note that this requirement is automatically fulfilled for most sensors, which use standardized packet protocols for defining data fields.

These restrictions establish an algebraic structure (homomorphic mapping with closure property) such that ID, TIMESTAMP, TYPE can serve as an intrinsic structure for any event. Additional fields generated are aggregated in such a manner that they form a DETAIL object, indexed by the ID. These DETAIL objects do not have to be uniquely defined, but are guaranteed to be a surjective mapping (one to many) or injective mapping (one to one) because the ID's are uniquely defined. DETAIL fields may be optional (equivalent to endomorphic mapping) if the ID, TIMESTAMP, TYPE fields suffice to define an event completely.

The closure property simply means that all transformations of events or results obtained through processing must also conform to the above restrictions. This guarantees that all operators used on the input events can also be applied recursively to outputs of transformations and other processing results.

For example, a classification of an event would generate a "classification event"→(ID, TIMESTAMP, CLASSIFICATION_EVENT) with a DETAIL record containing the results of the classification.

Once events in a data stream have been defined, conforming to the above restrictions, it is then possible to process events arriving through multiple, heterogeneous channels using a basic AETAC algorithm. (Note: in embodiments, events must be ordered by timestamp such that each arrival channel is an ordered time-series):

Step 1: Select earliest event from available channels using a harmonized timestamp field;
Step 2: Assign a unique ID (to be used as unique key to DETAIL object, if any, step 4);
Step 3: Assign a TYPE to event tuple, insuring that event tuple is fixed with respect to TYPE;
Step 4: Aggregate any remaining fields in DETAIL object, indexed by ID (step 2); and
Step 5: Repeat steps 1 through 4 until all events are defined.

Complex event processing (CEP) generally processes many kinds of events from a variety of sensors and collection devices. Each device poses an integration problem involving writing software to accept, validating and interpreting the input data and determine what actions need to be done for each sensor.

Embodiments of AETAC simplify this process by providing a shared mathematical structure to standardize the creation of event handlers and optimizing the reuse of code for allowing many different kinds of devices to use exactly the same code to process its data.

Furthermore, due to the mathematical closure property of embodiments of AETAC, the results and outputs of processing will also share this same structure and so can allow each layer of the system to automatically feed to the next layer recursively.

An innovative concept of embodiments of AETAC is the application of algebraic structure on the inputs and outputs of event processing, which allows AETAC to be an automatic 'tabulator' device for events, which can be easily correlated with other events because of the shared structure and closure properties.

Existing systems tend to become specialized in the symbols and formats used to characterize each system. As such, existing systems are dependent on specialized features, which may not be uniformly or consistently applied.

An analogous example of this kind of specialization is Roman Numerals, where for historical reasons, natural numbers can be represented and manipulated mathematically as sequential combinations of these seven symbols: I,V,X,L,C,D,M. The laws for combining these symbols are not applied consistently. For example, the immediate successor to any number is usually obtained by concatenating the symbol "I" to the number. So the successor of "I" is "II," and the successor of "V" is "VI". The successors for "III" and "VIII," however, are computed by prefixing "I" to the next larger symbol, namely "IV" and "IX," respectively. Roman Numerals are not complete. There are no Roman symbols for representing zero or negative numbers. Consequently, there is no simple or automatic way to tabulate a collection of Roman Numerals into another collection of Roman Numerals without a lot of complicated rules and processing.

Modern Arabic numerals, on the other hand, are written using combinations of the ten symbols 0,1,2,3,4,5,6,7,8,9. The successor to any number is simply and consistently determined by addition tables which are applied to any range of numbers using simple rules of arithmetic. Further, the Arabic numeral system is complete in the sense that any real number can be expressed, including zero and negative numbers. All outputs of calculations can be used as inputs to succeeding calculations in a completely 'mechanical' fashion.

In this same sense, embodiments of AETAC impose an algebraic structure on event processing that makes the processing independent of the type of event being processed, and insures consistent and uniform processing of events, where outputs are new kinds of events requiring further processing.

Figure 3A:
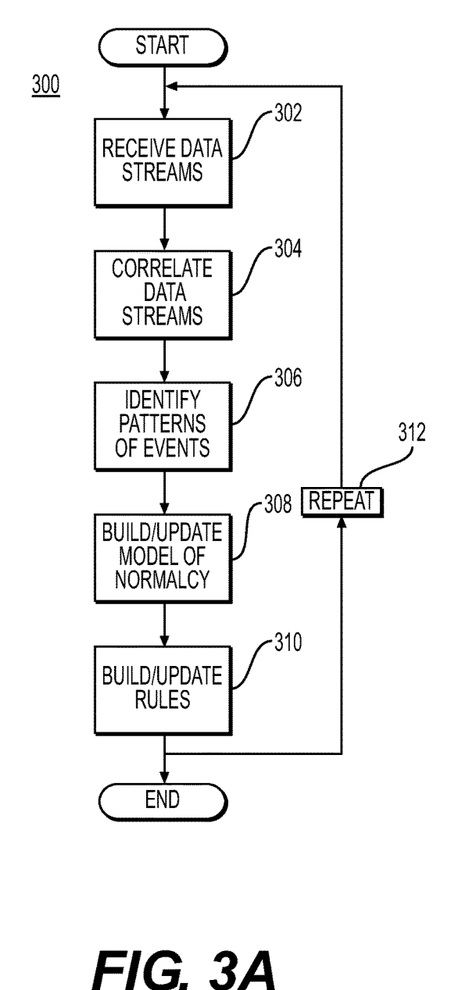
FIGS. 3A and 3B are flowcharts illustrating an embodiment of a method for real-time detection of anomalies in database or application usage.
Figure 3B:
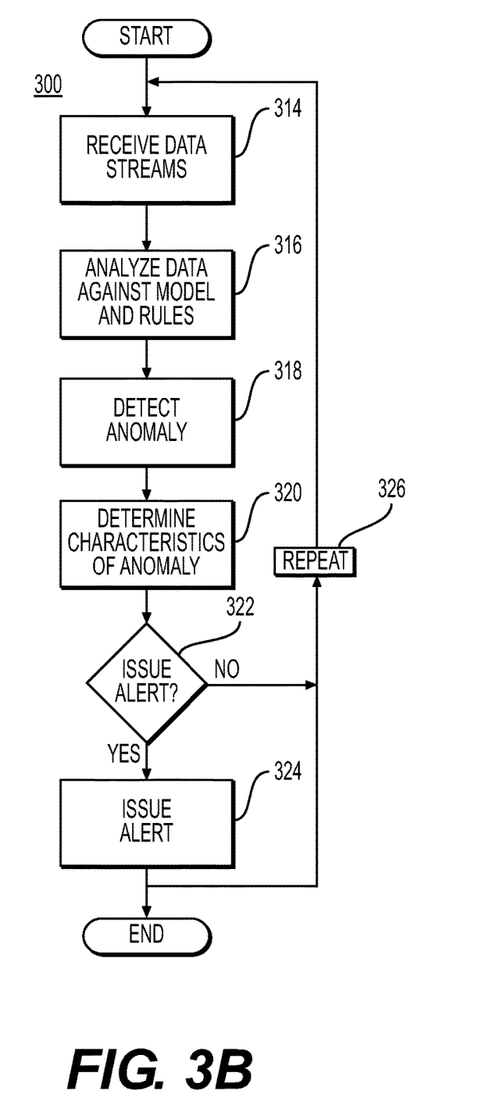

With reference now to FIGS. 3A-3B, shown is are flowcharts illustrating an embodiment of a method 300 for real-time detection of anomalies in database or application usage. FIG. 3A illustrates portion or section of method 300 for real-time detection of anomalies in database or application usage that builds model of normalcy and rules as described above. FIG. 3B illustrates portion or section of method 300 for real-time detection of anomalies in database or application usage that applies model of normalcy and rules to detect anomalies. Method 300 may be repeated to continuously update the model of normalcy and rules through, e.g., machine learning techniques, as described above. Likewise, method 300 may be performed continuously as data streams are received to continuously detect anomalies in real-time. Method 300 may implement SSA as described to build model of normalcy and rules and to detect anomalies.

With continuing reference to FIG. 3A, method 300 receives a plurality of data streams, block 302. The received data streams may be heterogeneous data streams received from a plurality of agents, programs, and/or sensors, etc. The data streams are correlated, block 304. The correlation 304 may include processing, e.g., with an embodiment of AETAC. The correlation 304 identifies events in the various data streams. Method 300 identifies patterns of events across the various data streams, block 306. The patterns may provide indications of relations between events in different data streams under typical operating conditions. Method 300 builds/creates a model or pattern of normalcy from the identified patterns of events, block 308. Utilizing the model of normalcy, method 300 may build/create rules, block 310, that determine how and whether anomalies are detected, how method 300 treats, characterizes and reacts to a detected anomaly, etc. For example, an event that may be characterized as an anomaly when occurring off-hours may not be an anomaly or an anomaly worth issuing an alert if occurring during normal business hours. Method 300 may repeat 302-310, block 312, over time using machine learning techniques to continue to build and update 308 the model of normalcy and build and update 310 the rules.

With reference again to FIG. 3B, method 300 may apply the model of normalcy and rules to operational behavior to detect anomalies. Method 300 receives a plurality of data streams 314. The received data streams, typically heterogeneous from a plurality of agents, programs, and/or sensors, etc., are processed (e.g., using an embodiment of AETAC) and the data from the data streams is analyzed against the model of normalcy and the rules, block 316. Based on the rules and how events, in relation to other events, fit or do not fit the model of normalcy, method 300 determines whether events are anomalous, thereby detecting anomalies, block 318. If an anomaly is detected 318, method 300 may determine the characteristics of the anomalous event(s), block 320. For example, an anomaly may be a user accessing a secured server after hours. If the user does access a secured server from time to time after hours, such an anomaly may not trigger an alert. If, however, the user is accessing the server from his office after hours but the user did not "badge in" (i.e., user's employee badge was not read by security at entrance to the building), then the anomaly would trigger an alert. Consequently, the rules and the characteristics of an anomaly may determine whether to issue an alert, block 322. For example, an anomaly indicating improper access to a server may only trigger continued monitoring of the user. The characteristics of an anomaly may also determine what type of alert to issue. Some anomalies may require a simple flag in a file for further follow-up by a human agent monitoring anomalies. Other anomalies may require immediate action, such as restricting or shutting off access to a network, locking down a building or portion of a building, alerting security, etc. If method 300 determines to issue an alert and the type of alert is determined, the alert is issued, block 324. Method 300 may continue to repeat 314 to 324, block 326, so long as systems, etc., are being monitored.

Figure 4:
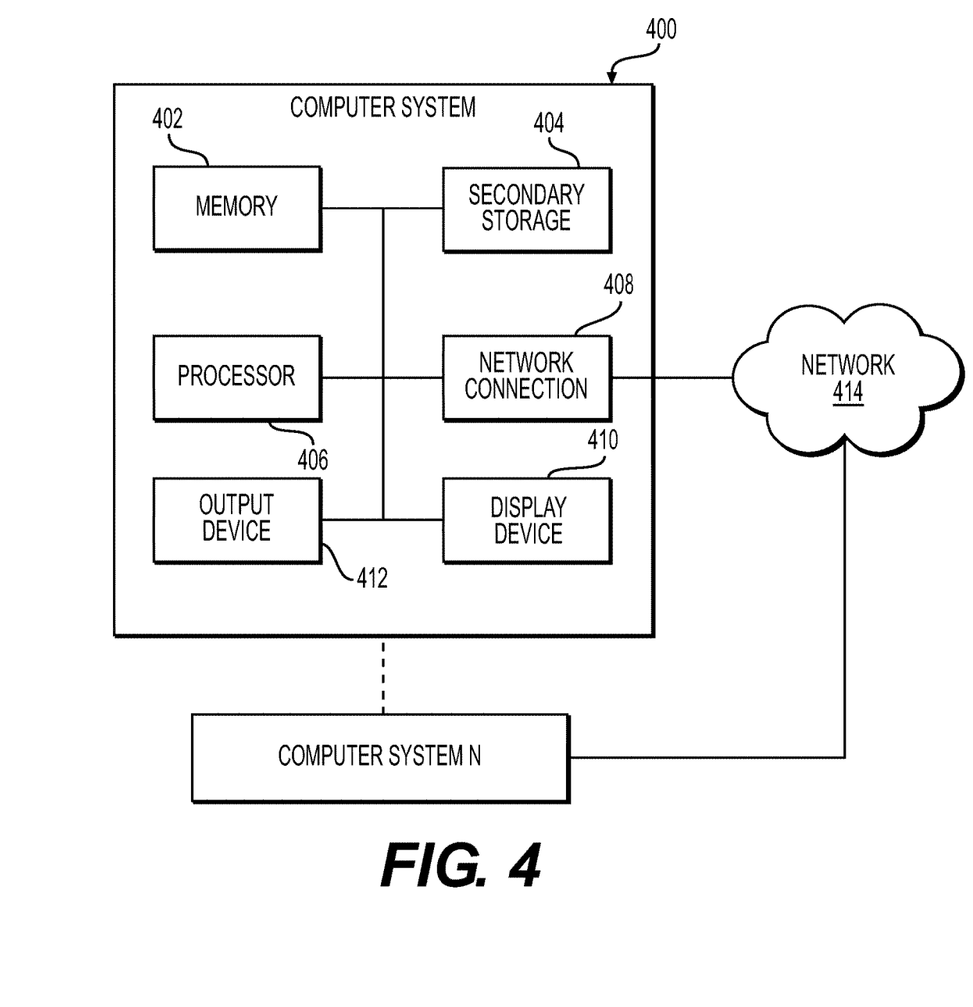
FIG. 4 is a block diagram illustrating exemplary hardware for implementing an embodiment of a system and method for real-time detection of anomalies in database or application usage.

With reference now to FIG. 4, shown is a block diagram of exemplary hardware that may be used to provide system 100 and perform method 300 for real-time detection of anomalies in database or application usage. Exemplary hardware implementation of system 100 may include multiple computing devices 400 (e.g., computing system N). Computing devices 400 may be, e.g., blade servers or other stack servers. For example, each component shown in system 100 may be implemented as software running on one or more computing devices 400. Alternatively, components and functionality of each may be combined and implemented as software running on a single computing device 400. Furthermore, steps of method 300 may be implemented as software modules executed on one or more computing devices 400.

Computing device 400 may include a memory 402, a secondary storage device 404, a processor 406, and a network connection 408. Computing device 400 may be connected a display device 410 (e.g., a terminal connected to multiple computing devices 400) and output device 412. Memory 402 may include RAM or similar types of memory, and it may store one or more applications (e.g., software for performing functions or including software modules described herein) for execution by processor 406. Secondary storage device 404 may include a hard disk drive, DVD-ROM drive, or other types of non-volatile data storage. Processor 406 executes the applications, which are stored in memory 402 or secondary storage 404, or received from the Internet or other network 414. Network connection 408 may include any device connecting computing device 400 to a network 414 and through which information is received and through which information (e.g., analysis results) is transmitted to other computing devices. Network connection 408 may include network connection providing connection to internal enterprise network, network connection provided connection to Internet or other similar connection. Network connection 408 may also include bus connections providing connections to other computing devices 400 in system 100 (e.g., other servers in server stack).

Display device 410 may include any type of device for presenting visual information such as, for example, a computer monitor or flat-screen display. Output device 412 may include any type of device for presenting a hard copy of information, such as a printer, and other types of output devices include speakers or any device for providing information in audio form. Computing device 400 may also include input device, such as keyboard or mouse, permitting direct input into computing device 400.

Computing device 400 may store a database structure in secondary storage 404 for example, for storing and maintaining information needed or used by the software stored on computing device 400. Also, processor 402 may execute one or more software applications in order to provide the functions described in this specification, specifically in the methods described above, and the processing may be implemented in software, such as software modules, for execution by computers or other machines. The processing may provide and support web pages and other user interfaces.

Although computing device 400 is depicted with various components, one skilled in the art will appreciate that the servers can contain additional or different components. In addition, although aspects of an implementation consistent with the above are described as being stored in memory, one skilled in the art will appreciate that these aspects can also be stored on or read from other types of computer program products or computer-readable media. The computer-readable media may include instructions for controlling a computer system, such as computing device 400, to perform a particular method, such as method 300.

More generally, even though the present disclosure and exemplary embodiments are described above with reference to the examples according to the accompanying drawings, it is to be understood that they are not restricted thereto. Rather, it is apparent to those skilled in the art that the disclosed embodiments can be modified in many ways without departing from the scope of the disclosure herein. Moreover, the terms and descriptions used herein are set forth by way of illustration only and are not meant as limitations. Those skilled in the art will recognize that many variations are possible within the spirit and scope of the disclosure as defined in the following claims, and their equivalents, in which all terms are to be understood in their broadest possible sense unless otherwise indicated.

The invention claimed is:

1. A computerized system for real-time detection of anomalies occurring in an enterprise computer network, comprising:
   at least one processor; and
   at least one memory including program code that, when executed by the at least one processor, causes the system to:
   receive a plurality of heterogeneous data streams from sources in the network, the sources including two levels, first level sources and second level sources,
   wherein the first level sources include one or more selected from a group consisting of agents located at databases; agents located at applications; audit programs located at user workstations; sensors located in the network; and sensors located at access points to the network;
   wherein the second level sources include one or more selected from a group consisting of data access, user behavior, computer activity and network activity; and
   wherein the first level sources monitor event streams of the second level sources and generate data streams indicative of corresponding second level source activity in a uniform format;
   process the heterogeneous data streams obtained by combining at least two of the first level sources to identify events therein, each event being identified by at least a unique ID, a timestamp, and an event type, wherein the processing of the heterogeneous data streams includes combining at least two of the first level sources into a single data stream;
   correlate the processed heterogeneous data streams to form an integrated data stream comprising a plurality of identified events;

detect the existence and at least one characteristic of an anomaly in the computer network by application of a predetermined model of normalcy and one or more anomaly rules to the integrated data stream comprising the plurality of identified events; and issue an alert based on the at least one characteristic of the anomaly.

2. The computerized system of claim 1, wherein the executed program code causes the system to create the predetermined model of normalcy and the one or more anomaly rules by:

receiving additional data comprising the plurality of heterogeneous data streams, wherein the additional data corresponds to authorized and benign usage of network resources;

processing the heterogeneous data streams to identify events therein, each even being identified by at least a unique ID, a timestamp, and an event type;

correlating the processed data streams to form an integrated data stream comprising a plurality of identified events;

identifying one or more patterns from relations between identified events comprising the integrated data stream; and creating the model of normalcy and the one or more anomaly rules based on the identified one or more patterns.

3. The computerized system of claim 2, wherein the additional data corresponds to an ordinary, authorized, and benign database query and an ordinary, authorized, and benign user interaction at a user workstation.

4. The computerized system of claim 3, wherein the predetermined model of normalcy comprises the user interaction at the user workstation within a predetermined period of time before the database query.

5. The computerized system of claim 3, wherein the detected anomaly comprises a lack of user interaction at the user workstation within a predetermined period of time before the database query.

6. The computerized system of claim 1, wherein the one or more anomaly rules relate to at least one of: how and whether anomalies are detected, how a detected anomaly is treated and characterized, and what reaction to employ in response to the detected anomaly.

7. The computerized system of claim 1, wherein the detected anomaly is indicative of unauthorized manipulation or falsification of data, sabotage of a database, or exfiltration of data.

8. The computerized system of claim 1, wherein the heterogeneous data streams comprise multi-modal asynchronous signals.

9. The computerized system of claim 1, wherein the alert comprises at least one of an alarm message, a communication triggering further analysis and/or action, a command instructing the restriction or shutting down of an affected workstation, database, network or network access, initiation of additional targeted monitoring, analysis, and/or applications to capture additional detailed information regarding an attack, continued monitoring of a user, placement of a flag in a file for further follow-up, restricting access to a network, alerting security, and restricting or locking down a building or a portion of a building.

10. The computerized system of claim 1, wherein the program code includes an algorithm that detects and extracts persistent events among the plurality of identified events in at least one of the plurality of heterogeneous data streams, and wherein the persistent events are time-stamped data that appear regularly overtime.

11. The computerized system of claim 10, wherein the persistent events appear in different distributed streams among the plurality of heterogeneous data streams.

12. The computerized system of claim 10, wherein the at least one of the plurality of heterogeneous data streams is statistically sampled to reduce stream size of the at least one of the plurality of heterogeneous data streams, without overlooking the persistent events.

13. The computerized system of claim 1, wherein the processing of the heterogeneous data streams includes transformation of heterogeneous data stream inputs into a standardized data structure to produce homomorphism.

14. The computerized system of claim 1, wherein the processing of the heterogeneous data streams includes using an automatic event tabulator and correlator.

15. The computerized system of claim 1, wherein the processing of the heterogeneous data streams includes operating on the single data stream using an algorithm that identifies temporal relationships.

16. The computerized system of claim 1, wherein the processing of the heterogeneous data streams includes operating on the single data stream using an algorithm that identifies spatial relationships.

17. A computerized system for real-time detection of anomalies occurring in an enterprise computer network, comprising:

at least one processor; and at least one memory including program code that, when executed by the at least one processor, causes the system to:

receive a plurality of heterogeneous data streams from sources in the network, the sources including two levels, first level sources and second level sources, wherein the first level sources include the following: agents located at databases; agents located at applications; audit programs located at user workstations; sensors located in the network; and sensors located at access points to the network; and wherein the second level sources include the following: email exchanges; instant messages; voice mails; documents; database content; and user interactions and database queries;

process the heterogeneous data streams obtained by combining at least one of the first level sources with at least one of the second level sources to identify events therein, each event being identified by at least a unique ID, a timestamp, and an event type;

correlate the processed heterogeneous data streams to form an integrated data stream comprising a plurality of identified events;

detect the existence and at least one characteristic of an anomaly in the computer network by application of a predetermined model of normalcy and one or more anomaly rules to the integrated data stream comprising the plurality of identified events; and issue an alert based on the at least one characteristic of the anomaly, wherein the executed program code causes the system to correlate the processed data streams by:

estimating the number or frequency of one or more event types in the processed data stream without searching the entire processed data stream; and determining one or more temporal, spatial, or generalized associations between a plurality of events in the processed data stream.

18. A non-transitory, computer-readable medium comprising a set of instructions for real-time detection of anomalies occurring in an enterprise computer network, wherein execution of said instructions by a system comprising at least one processor cause the system to:
receive a plurality of heterogeneous data streams from sources in the network, the sources including two levels, first level sources and second level sources,
wherein the first level sources include one or more selected from a group consisting of agents located at databases; agents located at applications; audit programs located at user workstations; sensors located in the network; and sensors located at access points to the network;
wherein the second level sources include one or more selected from a group consisting of data access, user behavior, computer activity and network activity; and
wherein the first level sources monitor event streams of the second level sources and generate data streams indicative of corresponding second level source activity in a uniform format;
process the heterogeneous data streams obtained by combining at least two of the first level sources to identify events therein, each event being identified by at least a unique ID, a timestamp, and an event type, wherein the processing of the heterogeneous data streams includes combining at least two of the first level sources into a single data stream;
correlate the processed heterogeneous data streams to form an integrated data stream comprising a plurality of identified events;
detect the existence and at least one characteristic of an anomaly in the computer network by application of a predetermined model of normalcy and one or more anomaly rules to the integrated data stream comprising the plurality of identified events; and
issue an alert based on the at least one characteristic of the anomaly.

19. The non-transitory, computer-readable medium of claim 18, wherein the executed instructions cause the system to create the predetermined model of normalcy and the one or more anomaly rules by:
receiving additional data comprising the plurality of heterogeneous data streams, wherein the additional data corresponds to authorized and benign usage of network resources;
processing the heterogeneous data streams to identify events therein, each even being identified by at least a unique ID, a timestamp, and an event type;
correlating the processed data streams to form an integrated data stream comprising a plurality of identified events;
identifying one or more patterns from relations between identified events comprising the integrated data stream; and
creating the model of normalcy and the one or more anomaly rules based on the identified one or more patterns.

20. The non-transitory, computer-readable medium of claim 19, wherein the additional data corresponds to an ordinary, authorized, and benign database query and an ordinary, authorized, and benign user interaction at a user workstation.

21. The non-transitory, computer-readable medium of claim 20, wherein the predetermined model of normalcy comprises the user interaction at the user workstation within a predetermined period of time before the database query.

22. The non-transitory, computer-readable medium of claim 20, wherein the detected anomaly comprises a lack of user interaction at the user workstation within a predetermined period of time before the database query.

23. The non-transitory, computer-readable medium of claim 18, wherein the one or more anomaly rules relate to at least one of: how and whether anomalies are detected, how a detected anomaly is treated and characterized, and what reaction to employ in response to the detected anomaly.

24. The non-transitory, computer-readable medium of claim 18, wherein the detected anomaly is indicative of unauthorized manipulation or falsification of data, sabotage of a database, or exfiltration of data.

25. The non-transitory, computer-readable medium of claim 18, wherein the heterogeneous data streams comprise multi-modal asynchronous signals.

26. The non-transitory, computer-readable medium of claim 18, wherein the alert comprises at least one of an alarm message, a communication triggering further analysis and/or action, a command instructing the restriction or shutting down of an affected workstation, database, network or network access, initiation of additional targeted monitoring, analysis, and/or applications to capture additional detailed information regarding an attack, continued monitoring of a user, placement of a flag in a file for further follow-up, restricting access to a network, alerting security, and restricting or locking down a building or a portion of a building.

27. The non-transitory, computer-readable medium of claim 18, wherein the program code includes an algorithm that detects and extracts persistent events among the plurality of identified events in at least one of the plurality of heterogeneous data streams, and wherein the persistent events are time-stamped data that appear regularly over time.

28. The non-transitory, computer-readable medium of claim 27, wherein the persistent events appear in different distributed streams among the plurality of heterogeneous data streams.

29. The non-transitory, computer-readable medium of claim 27, wherein the at least one of the plurality of heterogeneous data streams is statistically sampled to reduce stream size of the at least one of the plurality of heterogeneous data streams, without overlooking the persistent events.

30. The non-transitory, computer-readable medium of claim 18, wherein the processing of the heterogeneous data streams includes transformation of heterogeneous data stream inputs into a standardized data structure to produce homomorphism.

31. The non-transitory, computer-readable medium of claim 18, wherein the processing of the heterogeneous data streams includes using an automatic event tabulator and correlator.

32. The non-transitory, computer-readable medium of claim 18, wherein the processing of the heterogeneous data streams includes operating on the single data stream using an algorithm that identifies temporal relationships.

33. The non-transitory, computer-readable medium of claim 18, wherein the processing of the heterogeneous data streams includes operating on the single data stream using an algorithm that identifies spatial relationships.

34. A non-transitory, computer-readable medium comprising a set of instructions for real-time detection of anomalies occurring in an enterprise computer network, wherein execution of said instructions by a system comprising at least one processor cause the system to:
 receive a plurality of heterogeneous data streams from sources in the network, the sources including two levels, first level sources and second level sources,
 wherein the first level sources include the following: agents located at databases; agents located at applications; audit programs located at user workstations; sensors located in the network; and sensors located at access points to the network; and
 wherein the second level sources include the following: email exchanges; instant messages; voice mails; documents; database content; and user interactions and database queries;
 process the heterogeneous data streams obtained by combining at least one of the first level sources with at least one of the second level sources to identify events therein, each event being identified by at least a unique ID, a timestamp, and an event type;
 correlate the processed heterogeneous data streams to form an integrated data stream comprising a plurality of identified events;
 detect the existence and at least one characteristic of an anomaly in the computer network by application of a predetermined model of normalcy and one or more anomaly rules to the integrated data stream comprising the plurality of identified events; and
 issue an alert based on the at least one characteristic of the anomaly, wherein the executed instructions cause the system to correlate the processed data streams by:
 estimating the number or frequency of one or more event types in the processed data stream without searching the entire processed data stream; and
 determining one or more temporal, spatial, or generalized associations between a plurality of events in the processed data stream.

35. A computerized system for real-time detection of anomalies occurring in an enterprise computer network, comprising:
 at least one processor; and
  at least one memory including program code that, when executed by the at least one processor, causes the system to:
   receive a plurality of heterogeneous data streams from sources in the network, the sources including two levels, first level sources and second level sources,
   wherein the first level sources include one or more selected from a group consisting of agents located at databases; agents located at applications; audit programs located at user workstations; sensors located in the network; and sensors located at access points to the network;
   wherein the second level sources include one or more selected from a group consisting of data access, user behavior, computer activity and network activity; and
   wherein the first level sources monitor event streams of the second level sources and generate data streams indicative of corresponding second level source activity in a uniform format;
   process the heterogeneous data streams obtained by combining at least two of the first level sources to identify events therein, each event being identified by at least a unique ID, a timestamp, and an event type, wherein the processing of the heterogeneous data streams includes:
    combining at least two of the first level sources into a single data stream; and
    operating on the single data stream using an algorithm that identifies spatiotemporal relationships;
   correlate the processed heterogeneous data streams to form an integrated data stream comprising a plurality of identified events;
   detect the existence and at least one characteristic of an anomaly in the computer network by application of a predetermined model of normalcy and one or more anomaly rules to the integrated data stream comprising the plurality of identified events; and
   issue an alert based on the at least one characteristic of the anomaly.

36. A non-transitory, computer-readable medium comprising a set of instructions for real-time detection of anomalies occurring in an enterprise computer network, wherein execution of said instructions by a system comprising at least one processor cause the system to:
 receive a plurality of heterogeneous data streams from sources in the network, the sources including two levels, first level sources and second level sources,
 wherein the first level sources include one or more selected from a group consisting of agents located at databases; agents located at applications; audit programs located at user workstations; sensors located in the network; and sensors located at access points to the network;
 wherein the second level sources include one or more selected from a group consisting of data access, user behavior, computer activity and network activity; and
 wherein the first level sources monitor event streams of the second level sources and generate data streams indicative of corresponding second level source activity in a uniform format;
 process the heterogeneous data streams obtained by combining at least two of the first level sources to identify events therein, each event being identified by at least a unique ID, a timestamp, and an event type, wherein the processing of the heterogeneous data streams includes:
  combining at least two of the first level sources into a single data stream; and
  operating on the single data stream using an algorithm that identifies spatiotemporal relationships;
 correlate the processed heterogeneous data streams to form an integrated data stream comprising a plurality of identified events;
 detect the existence and at least one characteristic of an anomaly in the computer network by application of a predetermined model of normalcy and one or more anomaly rules to the integrated data stream comprising the plurality of identified events; and
 issue an alert based on the at least one characteristic of the anomaly.

37. A system for real-time detection of anomalies occurring in a computer network, comprising:
 at least one processor; and
 at least one memory including program code that, when executed by the at least one processor, causes the system to:
  receive a plurality of heterogeneous data streams from sources in the network, the sources including first level sources and second level sources,
  wherein the first level sources include one or more selected from a group consisting of agents located at databases, agents located at applications, audit programs located at user workstations, sensors located in the network, and sensors located at access points to the network;

wherein the second level sources include event streams to be analyzed;

wherein the first level sources monitor the event streams of the second level sources and generate data streams indicative of corresponding second level source activity in a uniform format; and wherein each of the heterogeneous data streams is obtained by combining at least two of the first level sources into a data stream;

process the heterogeneous data streams to identify events therein, each event being identified by at least a unique ID, a timestamp, and an event type;

correlate the processed heterogeneous data streams to form an integrated data stream comprising a plurality of identified events;

detect the existence and at least one characteristic of an anomaly in the computer network by application of a predetermined model of normalcy and one or more anomaly rules to the integrated data stream comprising the plurality of identified events; and issue an alert based on the at least one characteristic of the anomaly.

38. The system of claim 37, wherein the second level sources include one or more selected from the group consisting of data access, user behavior, computer activity and network activity.

* * * * *